United States Patent [19]

Dessureault

[11] Patent Number: 5,570,303

[45] Date of Patent: Oct. 29, 1996

[54] SYSTEM FOR COLLECTING OCEANOGRAPHIC DATA FROM A MOVING VESSEL

[75] Inventor: Jean-Guy Dessureault, Dartmouth, Canada

[73] Assignee: Her Majesty in right of Canada as represented by the Department of Fisheries and Oceans., Ottawa, Canada

[21] Appl. No.: 520,415

[22] Filed: Aug. 29, 1995

[30] Foreign Application Priority Data

Dec. 12, 1994 [CA] Canada ................................ 2137846

[51] Int. Cl.$^6$ ................................................. G01B 3/00
[52] U.S. Cl. ................................. 364/562; 73/170.33
[58] Field of Search ................................ 364/562, 561;
73/170.29, 170.33; 242/390.8, 390.9, 389,
390, 390.1, 390.6, 370, 225; 441/21, 23–26,
29, 33; 114/244, 312, 245

[56] References Cited

U.S. PATENT DOCUMENTS

| | | |
|---|---|---|
| 3,339,407 | 9/1967 | Campbell et al. |
| 3,397,573 | 8/1968 | Carter. |
| 3,596,070 | 7/1971 | McCool et al. ................. 114/245 |
| 3,747,405 | 7/1973 | Fort et al. ...................... 73/170.33 |
| 3,922,808 | 12/1975 | Rieth et al. ................... 73/170.33 |
| 4,010,706 | 3/1977 | Pretet .............................. 114/245 |
| 4,157,657 | 6/1979 | Hinchman ...................... 73/53.01 |
| 4,175,432 | 11/1979 | Gibson .......................... 73/170.33 |
| 4,462,265 | 7/1984 | Rein .............................. 73/863.33 |
| 4,686,927 | 8/1987 | Hawkes et al. .................. 114/312 |
| 4,713,967 | 12/1987 | Overs et al. ................... 73/170.33 |
| 4,974,536 | 12/1990 | Archibald ........................ 114/244 |
| 5,495,157 | 2/1996 | Dade .............................. 242/225 |

Primary Examiner—James Trammell
Attorney, Agent, or Firm—Ronald G. Bitner

[57] ABSTRACT

A system for the automated deployment and retrieval of an oceanographic data collecting probe from a vessel in motion. The system involves ejecting the probe line rapidly from a drum such that substantially all of the line is deposited in proximity with the region of descent of the probe to reduce line drag for rapid probe descent. The system is designed for repeated deployment and retrieval of the line allowing unattended operation.

10 Claims, 4 Drawing Sheets

5,570,303

SYSTEM FOR COLLECTING OCEANOGRAPHIC DATA FROM A MOVING VESSEL

FIELD OF THE INVENTION

This invention relates to a system for obtaining oceanographic profile data from a moving vessel.

BACKGROUND OF THE INVENTION

Physical oceanography is more and more being asked to provide descriptions and forecasts of ocean environmental parameters for climate, fisheries and ice forecasting purposes. XBT's (Expendable BathyThermograph), surface drifters and satellite SST (Sea Surface Temperature) sensors have provided the tools to measure the upper ocean temperature, but in many areas of the ocean the salinity is also important in determining mixed layer properties and dynamic height for velocity calculations. Over most of the world's oceans, the seasonal layer of the ocean is less than 300 m deep, but in the high northern latitudes were salinity is particularly important, winter mixed layers can exceed 1000 m in depth. Salinity measurements can be obtained using towed profiling instrumentation, but these systems require the use of hard faired cables in order to achieve operating range of 300 to 500 m. This makes these systems complex, expensive and difficult to deploy and recover.

Various devices are known or have been proposed for the collection of data relating ocean properties such as temperature and salinity with respect to depth. Most of these devices involve deploying a probe or "fish" from a vessel and transmitting the data to the vessel as the probe descends. These are commonly known in the art as a CID (Conductivity-Temperature-Depth). Examples of prior devices are disclosed in U.S. Pat. No. 3,339,407 to Campbell, et al, and U.S. Pat. No. 3,397,573 to Carter. In these patents the probes described are expendable.

Some expendable instruments are able to achieve deep profiles from vessels underway because the line connecting the probe with the vessel pays out from both the probe and the launcher. Thus the line does not move relative to the water and there is no drag force. Applying this principle for a recoverable body may be theoretically possible, but rewinding the line into the probe following each deployment would be a very complex operation.

In order to facilitate economical acquisition of data, and also to avoid lo discarding probes on the bottom of the ocean, it would be desirable to be able to provide automated repeating deployment and retrieval of a descending probe while the vessel is in motion. Preferably, the system should allow continuous operation with various types of vessels in transit at the normal velocity of the vessel. Further, it would be desirable to be able to control operation with little human intervention, for example, from the bridge of the vessel.

Achieving these goals is made increasingly difficult at higher vessel velocities. Higher vessel velocities means that longer lines are required to achieve a given probe depth. In turn, longer lines result in higher drag which slows the descent rate, and increases recovery load. Hence, higher velocities tend to limit o the depth that can be practically achieved.

SUMMARY OF THE INVENTION

An object of the present invention is to provide a system that facilitates acquisition of oceanographic profile data from a vessel in motion.

A more specific object of the present invention is to provide a system that allows for the automated continuously repeating deployment and retrieval of a data collecting probe from a vessel in motion.

It has been found that repeating profile data acquisition from a vessel in motion is facilitated by a system that ejects a line, to which a probe is attached, at a high rate such that substantially all of the line, required for the selected probe depth, is deposited in proximity with the region of descent of the probe, such that the probe is free to descend quickly with relatively little drag from the line.

The present invention provides a system for the automated collection of oceanographic profile data from a vessel in motion, comprising; a hydrodynamically streamlined probe having sensing means for collecting oceanographic data; a winch including a drum for storing a line connecting the probe with the vessel; line ejecting means for deploying the line rapidly from the drum and for depositing substantially all the line, required for a selected probe depth, in the water in proximity with the region of descent of the probe; deployment indicating means for providing an indication of the length of line deployed by the line ejecting means; line deployment control means for receiving a probe depth request instruction, activating the line ejecting means for initiating line deployment, and terminating line deployment when the line deployment indicating means indicates a deployed line length sufficient to provide the selected probe depth; and line retrieval control means associated with the winch for controlling rotation of the drum for raising the probe in preparation for subsequent redeployment.

DESCRIPTION OF THE PREFERRED EMBODIMENT

Figure 1:
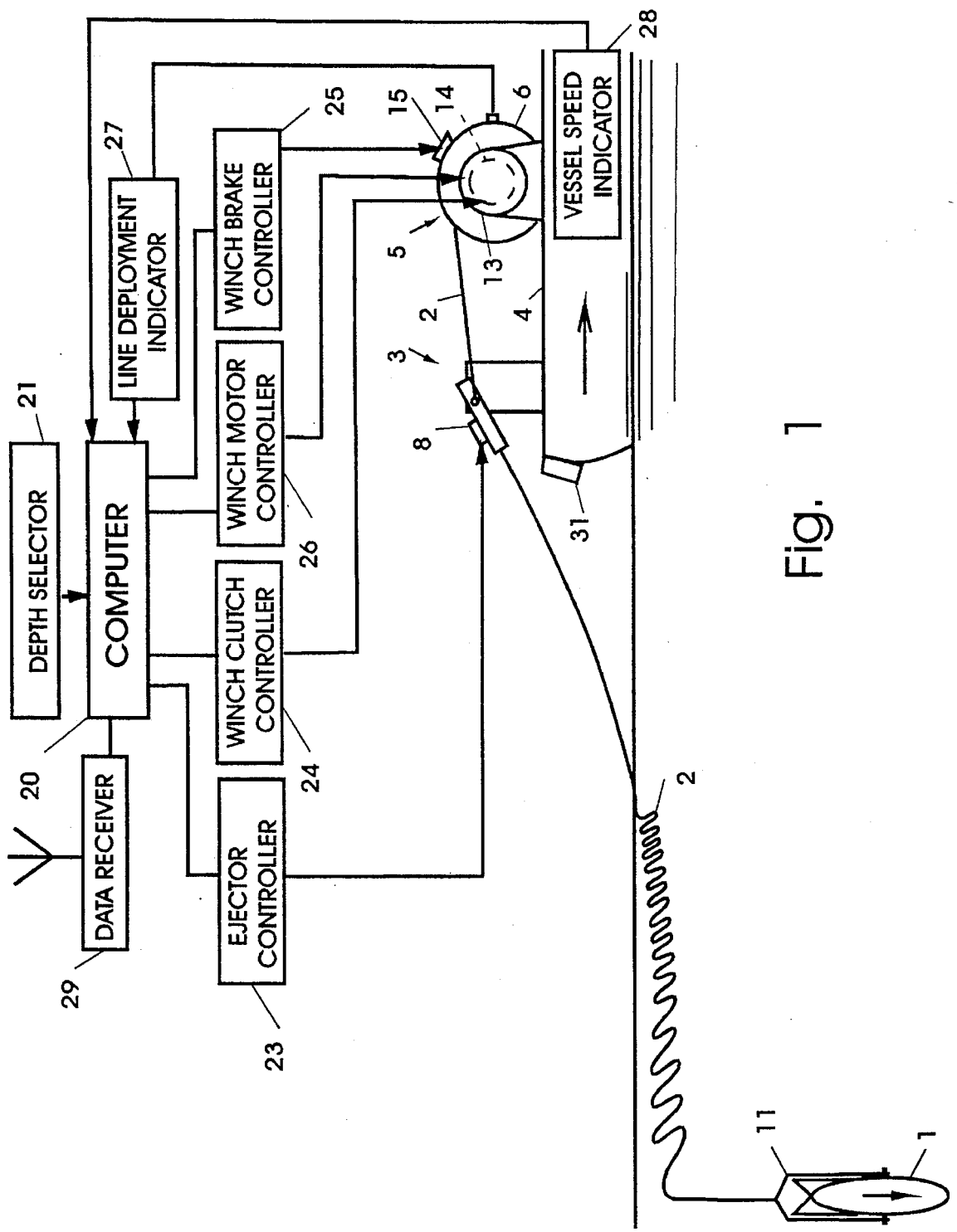
FIG. 1 is a schematic representation of the system of the present invention with the line deployed and the probe beginning descent.
Figure 2:
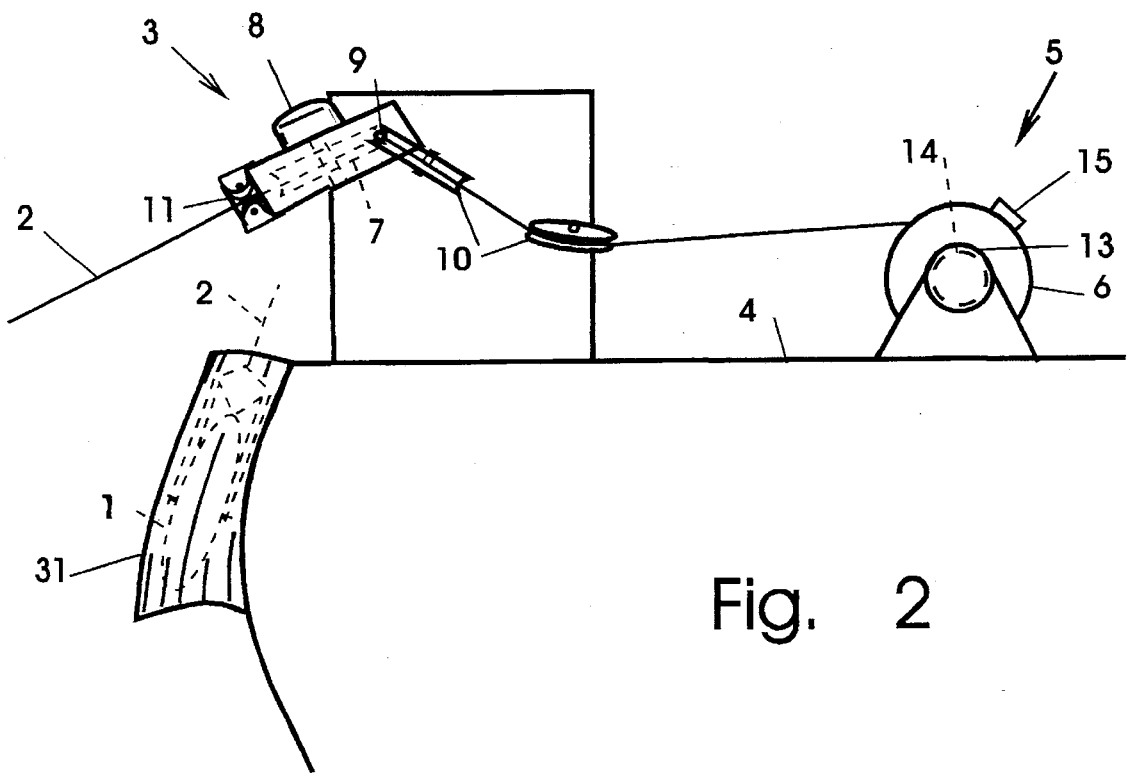
FIG. 2 is an schematic elevation showing details of the line ejecting and retrieving means.
Figure 3:
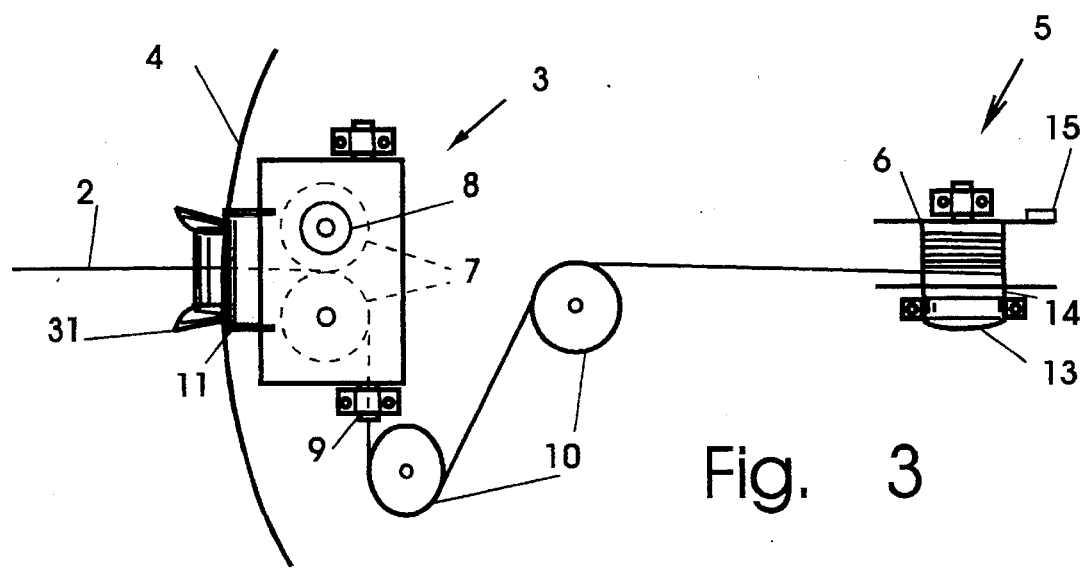
FIG. 3 is a plan view of the line deploying and retrieving means shown in FIG. 2

With reference to FIG. 1 to 3, the system includes a probe 1, line 2, line ejecting means 3 and line retrieving means in the form of a winch 5 mounted on a vessel 4.

The winch 5 includes a drum 6, for storing the line 2 that connects the probe 1 with the vessel 4.

Figure 4:
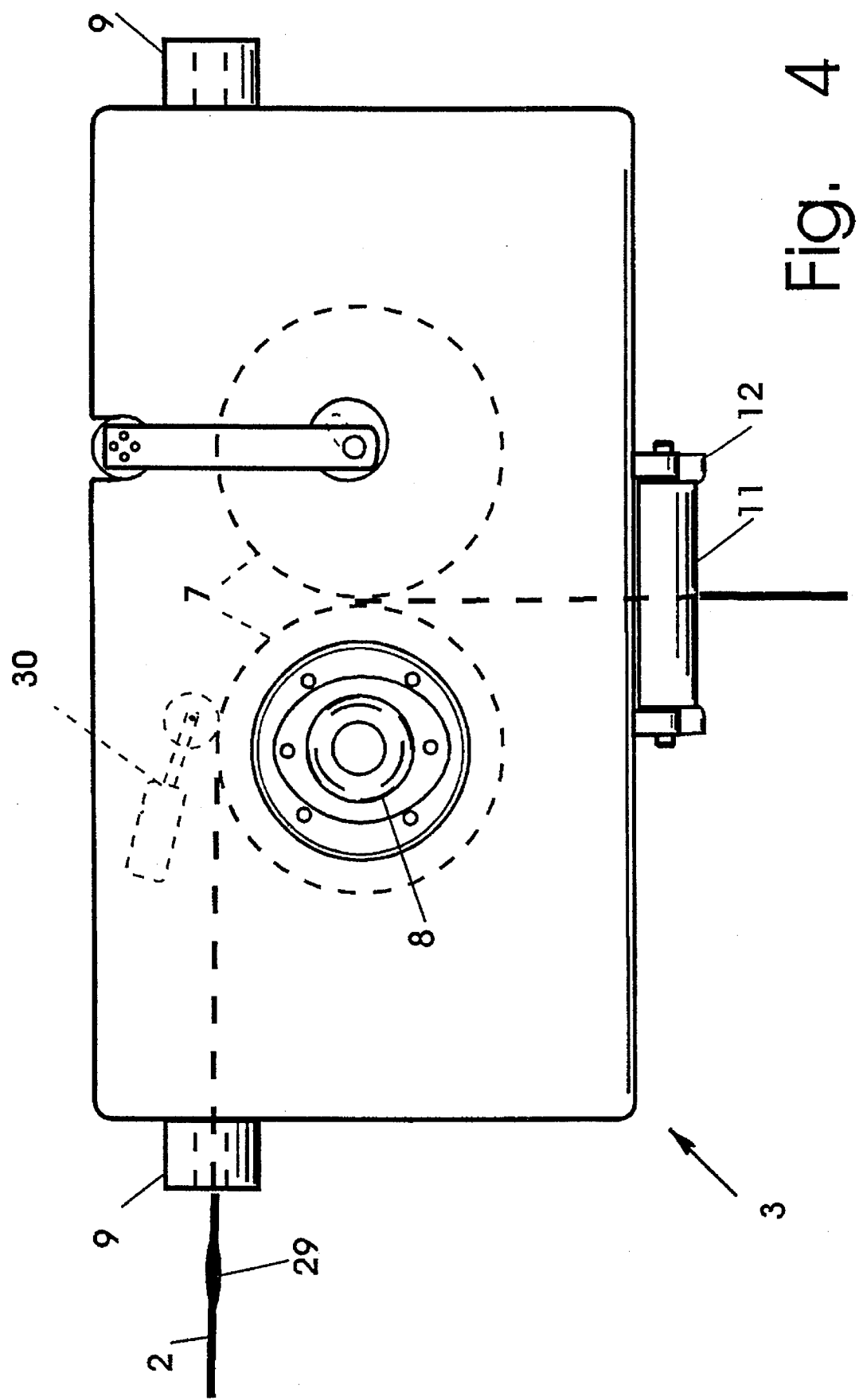
FIG. 4 if an enlarged view of the line deploying means.

With specific reference to FIGS. 2, 3 and 4, the line ejecting means 3 comprises a pair of traction rollers 7 driven by a suitable motor 8 which pulls the line off the drum 6 at high speed and deposits it in the water. The line ejecting means 3 unwinds the line rapidly from the drum 6 and deposits substantially all the line 2, required for the selected probe depth, in the water in proximity with the region of descent of the probe 1, as shown in FIG. 1. Details of the line ejection means are illustrated in FIG. 4.

The traction rollers 7 are mounted in a housing which is pivotally mounted about a horizontal pivot 9 whose axis is generally perpendicular to a longitudinal axis of the vessel 4. Such pivotal mounting of the ejecting means accommodates vaporing angles as the line is winced back under tension. The line 2 is guided from traction rollers 7 through guiding rollers 11 and lateral guides 12. Preferably the line ejecting means 3 will be directed generally downwardly towards the water, during line deployment, to reduce the probability of entanglement of the line the air by strong gusts of wind.

The winch 5 is powered by a suitable motor 13 that is interconnected with drum 6 by a clutch 14, and provided with a brake 15. Pulleys 10 control the path of the line between the winch 5 and line ejector 3.

The probe 1 is shown with a pivoting bridle 11 that facilitates low drag and stability in the descent stage, as shown in FIG. 1, and also in the retrieval stage where the bridal 10 pivots to the front of the probe.

The line 2 is preferably a relatively supple braided line that does not kink or tangle easily. A suitable material for such a line is a urethane jacketed aramid fiber. The line jacket preferably has a low drag coefficient to reduce recovery tension.

With reference to FIG. 1, line ejection is controlled by a suitable control unit 23. The motor 13 of winch 5 is controlled by controller 26, the clutch 14 is engaged and disengaged by controller 24 and the brake 15 is activated by controller 25.

The system includes suitable line deployment indicating means 27 for providing a measure of the length of line 2 deployed by the line ejecting means 3. The indicating means 27 may be in the form of a revolution counter associated with the drum 6, but could also be associated with the line ejecting means 3, or detection means for detecting a suitable detectable element or elements on the line.

For control of operation, a central computer 20 is programmed to perform a number of functions including: receiving a probe depth request instruction provided by depth selector 21; activating the line ejecting means 3 for line deployment, via deployment control unit 23; calculating the amount of line required based on the selected probe depth, plus the distance traversed by the vessel while the probe descends following line deployment utilizing the vessel speed indicator 28, and terminating deployment, via the control unit 23, when the line deployment indicating means 27 indicates a deployed line length providing the selected probe depth, with provision for the distance travelled; activating or releasing the brake 15 on drum 6 by means of controller 25; and controlling clutch 14 via controller 24, for engaging or disengaging the drum 6 from motor 13. The computer 20 may also be utilized to receive and control transmission of data from the probe to receiver 29, as well as performing other control functions.

In operation, with the desired probe depth selected via depth selector 21, deployment of the line 2, to which the probe 1 is attached, is initiated via controller 23. With winch clutch 14 and brake 15 of drum 6 disengaged, via controllers 24 and 25, respectively, the line ejecting means 3 unwinds the line rapidly (typically 20 m/s) from the drum 6 such that substantially all of the line, required for the selected probe depth, is deposited in the water in proximity with the region of descent of the probe. The proximity of the line to the point of descent reduces the drag on the line allowing the probe to descend at a relatively high rate. Use of a hydrodynamically streamlined probe further facilitates rapid descent. It can be seen that during the time interval that the probe descends, an additional length of line will be required corresponding to the distance that the vessel has travelled during the time interval that the probe descends. Hence the line length additional to the desired probe depth, will be related to the vessel speed and probe descent rate.

Preferably the line ejecting means 3 will be oriented to direct the line generally downwardly towards the water during line deployment. The water provides damping to motion of the line to reduce the probability of entanglement of the line, which is more likely to occur when deployed a long distance through the air.

The probe descent rate is determined by its drag and the drag of the line pulled behind it. Since the amount of line is a function of depth, the drag and hence the rate of descent can be calculated at all depths. Knowing the probe descent rate, depth versus time can be calculated. The amount of line required is the sum of the depth plus the distance travelled by the vessel during that same time.

The computer 20 calculates the amount of line required based on the selected probe depth, plus provision for the additional line length required for vessel travel during the time interval of probe descent, utilizing the vessel speed indicator 28. When the line deployment indicating means 27 indicates a deployed line length sufficient to provide the selected depth, the control unit 23 deactivates the line ejecting means 3 and controller 25 activates the winch brake 15. Following a suitable time interval computed to provide the desired probe depth, the brake 15 is released, utilizing controller 25, and the line 2 is retrieved unto the drum 6 driven by motor 13, with engagement of clutch 14, via controller 24. Referring to FIG. 4 a marker on the line, such as enlargement 29, near the probe, in conjunction with suitable detector 30 may be used for detection of completion of spooling of the line to the drum during the retrieval stage to provide the necessary signal to disengage the clutch 14 and activate the brake 15, via controllers 24 and 25, for termination of line retrieval. Alternatively, the line deployment indicating means 27 may be utilized to provide the necessary termination signal.

Data stored in the probe may be transferred to a suitable receiver 29 while the probe is resting in cradle 31. Data may also be transfeted from the probe utilizing the interconnecting line 2.

Figure 5:
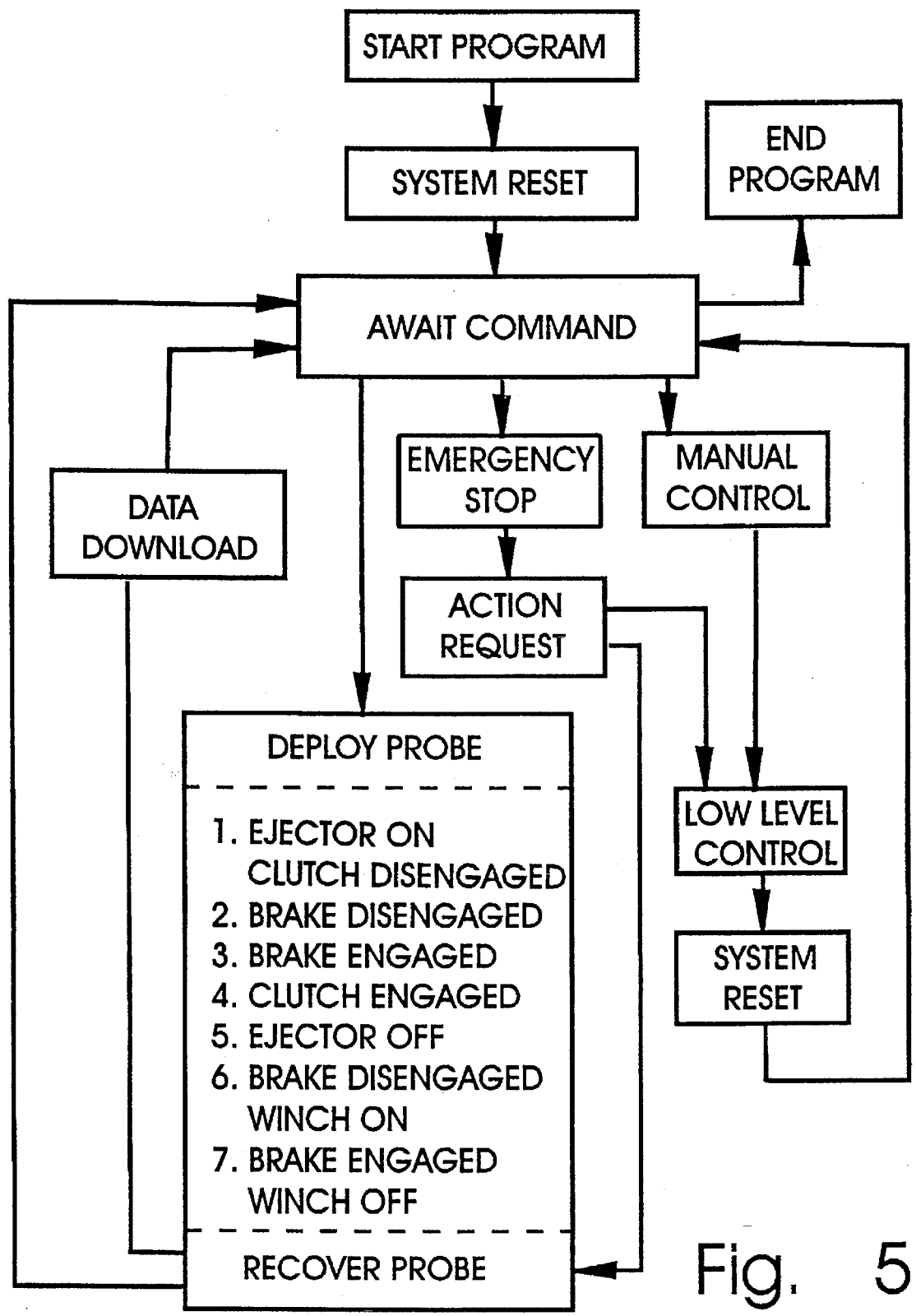
FIG. 5 is a block diagram illustrating control of the system.

The sequence of operation of the system is illustrated in FIG. 5.

During descent and/or recovery of the probe, data collected by the probe sensors can be recorded internally on a suitable recording device and subsequently transmitted to a suitable receiver 29, via a two way radio modem.

A prototype of a system as described above has achieved a probe depth of 600 m from a vessel travelling at 11 knots, using 1600 m of line.

A mathematical model predicts that the depth that can be reached for various speeds are as follows: 900 m at 14 knots, 600 m at 18 knots, 470 m at 20 and 370 m at 22 knots. Those limits are based on the working strength of a 10 mm diameter line.

What is claimed is:

1. A system for the automated collection of oceanographic profile data from a vessel in motion, comprising:

a) a hydrodynamically streamlined probe having sensing means for collecting oceanographic data;

b) a winch including a drum for storing a line connecting the probe with the vessel;

c) line ejecting means for deploying the line rapidly from the drum and for depositing substantially all the line, required for a selected probe depth, in the water in proximity with the region of descent of the probe;

d) line deployment indicating means for providing an indication of the length of line deployed by the line ejecting means;

e) line deployment control means for receiving a probe depth request instruction, activating the line ejecting means for initiating line deployment, and terminating line deployment when the line deployment indicating means indicates a deployed line length sufficient to provide the selected probe depth; and f) winch control means for controlling rotation of the drum for retrieval of the probe.

2. The system of claim 1 further comprising vessel velocity indicating means, and line length requirement computing means for determining the length of line required for the selected probe depth and adding the distance traversed by the vessel while the probe descends following line deployment.

3. The system of claim 1 further comprising detecting means for indicating retrieval of the line and probe in preparation for subsequent redeployment.

4. The system of claim 1 wherein the line ejecting means comprises a pair of driven traction rollers.

5. The system of claim 4 wherein the line traction rollers are mounted in a housing which is pivotally mounted about a horizontal axis substantially perpendicular to a longitudinal axis of the vessel.

6. The system of claim 4 wherein the line deployment indicating means comprises a revolution counter associated with the drum or the traction rollers.

7. The system of claim 1 further comprising data recorder means disposed in the probe.

8. The system of claim 1 further comprising data transmitting means associated with the probe and data receiving means associated with the vessel.

9. The system of claim 1 further comprising brake means associated with the drum and responsive to a brake signal from the winch control means for terminating line deployment.

10. The system of claim 1 wherein the winch includes drive means and a clutch for selectively engaging and disengaging the drive means from the drum.

* * * * *